United States Patent [19]

Akiyama et al.

[11] Patent Number: 5,453,860

[45] Date of Patent: Sep. 26, 1995

[54] SPATIAL LIGHT MODULATOR HAVING A PHOTOCONDUCTOR WITH GROOVES AND A QUANTUM EFFICIENCY GREATER THAN UNITY

[75] Inventors: Koji Akiyama; Akio Takimoto, both of Neyagawa; Hisahito Ogawa, Nara, all of Japan

[73] Assignee: Matsushita Electric Industrial Co., Ltd., Kadoma, Japan

[21] Appl. No.: 96,470

[22] Filed: Jul. 22, 1993

[30] Foreign Application Priority Data

Jul. 24, 1992 [JP] Japan ..................... 4-198596

[51] Int. Cl.$^6$ .................................................. G02F 1/135
[52] U.S. Cl. ................................ 359/72; 257/438
[58] Field of Search ...................... 359/72; 257/438

[56] References Cited

U.S. PATENT DOCUMENTS

| | | | |
|---|---|---|---|
| 3,958,207 | 5/1976 | Tutihasi ........................... | 338/15 |
| 3,976,361 | 8/1976 | Fraas et al. ..................... | 359/72 |
| 4,119,840 | 10/1978 | Nelson ........................... | 359/72 |
| 4,693,561 | 9/1987 | Ashley et al. ................... | 359/72 |
| 4,909,606 | 3/1990 | Wada et al. ..................... | 359/63 |
| 4,913,531 | 4/1990 | Efron et al. ..................... | 359/72 |
| 5,073,010 | 12/1991 | Johnson et al. .................. | 359/72 |

FOREIGN PATENT DOCUMENTS

| | | |
|---|---|---|
| 0265903 | 5/1988 | European Pat. Off. . |
| 0494666 | 7/1992 | European Pat. Off. . |
| 1955915 | 6/1970 | Germany . |
| 1216581 | 8/1989 | Japan . |
| 2-2507 | 1/1990 | Japan . |
| 2269307 | 11/1990 | Japan . |

OTHER PUBLICATIONS

Moddel et al, Appl. Phys. Lett., 55(6), pp. 537–539, Aug. 7, 1989, "High–Speed Binary Optically Addressed Spatial Light Modulator".

Akiyama et al, *Japanese Journal of Applied Physics*, vol. 30, No. 12B, pp. 3887–3892, Dec. 1991, "A New Optical Neuron Device for All-Optical Neural Networks".

Chin et al, *Electronics Letters*, vol. 16, No. 12, Jun. 5, 1980, pp. 467–469, "Impact Ionisation in Multilayered Heterojunction Structures".

Jwo et al, *IEEE Transactions on Electron Devices*, vol. 35, No. 8, pp. 1279–1282, Aug. 1988, "Amorphous Silicon/ Silicon Carbide Superlattice Avalanche Photodiodes".

Wong et al, *IEEE Transactions on Electron Devices*, vol. 37, No. 8, pp. 1804–1808, Aug. 1990, "Optical and Noise Characteristics of Amorphous Si/SiC Superlattice Reach-Through Avalanche Photodiodes".

Hong et al, *IEEE Journal of Quantum Electronics*, vol. 26, No. 2, pp. 280–284, Feb. 1990, "The Hydrogenated Amorphous Silicon Reach-Through Avalanche Photodiodes (a-Si:H RAPD's)".

Chang et al, "Amorphous Si/SiC Phototransistors and Avalanche Photodiodes", IEE Proceedings-J., vol. 138, No. 3, Jun. 1991, pp. 226–234.

*Primary Examiner*—William L. Sikes
*Assistant Examiner*—Ron Trice
*Attorney, Agent, or Firm*—Renner, Otto, Boisselle & Sklar

[57] ABSTRACT

A spatial light modulator includes: a modulating layer having optical properties changeable depending on the strength of an applied electric field; a pair of transparent electrode layers sandwiching the modulating layer for generating the electric field; and a photoconductor layer disposed between one of the pair of transparent electrode layers and the modulating layer for generating a photocurrent corresponding to the illumination by light, wherein the photoconductor layer has a quantum efficiency of more than 1. A method for fabricating the spatial light modulator is also disclosed.

4 Claims, 5 Drawing Sheets

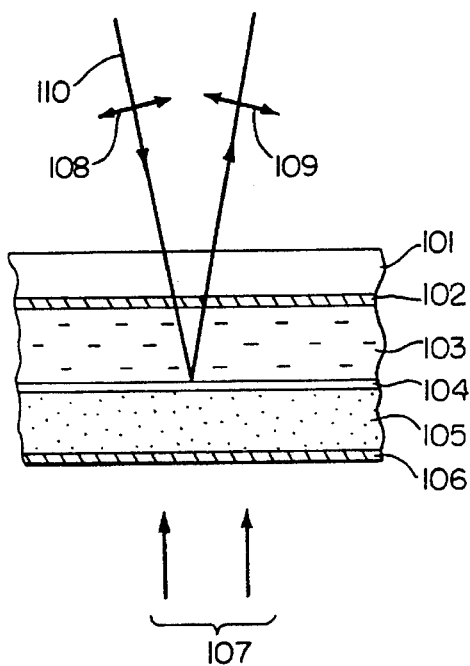
FIG. 1
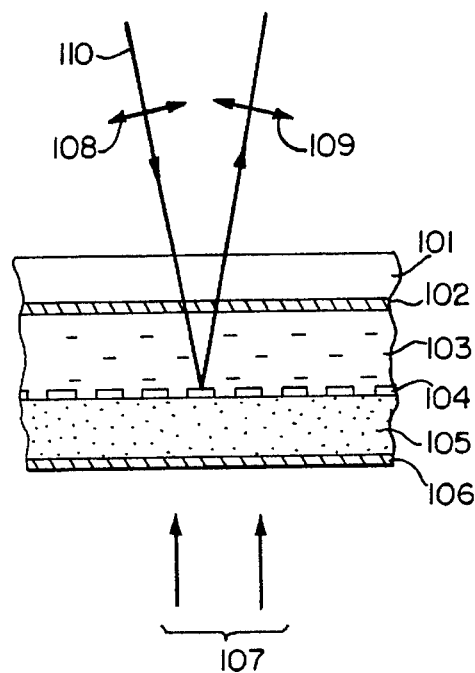
FIG. 2
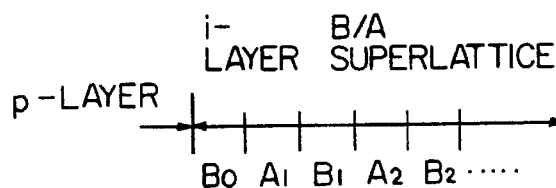
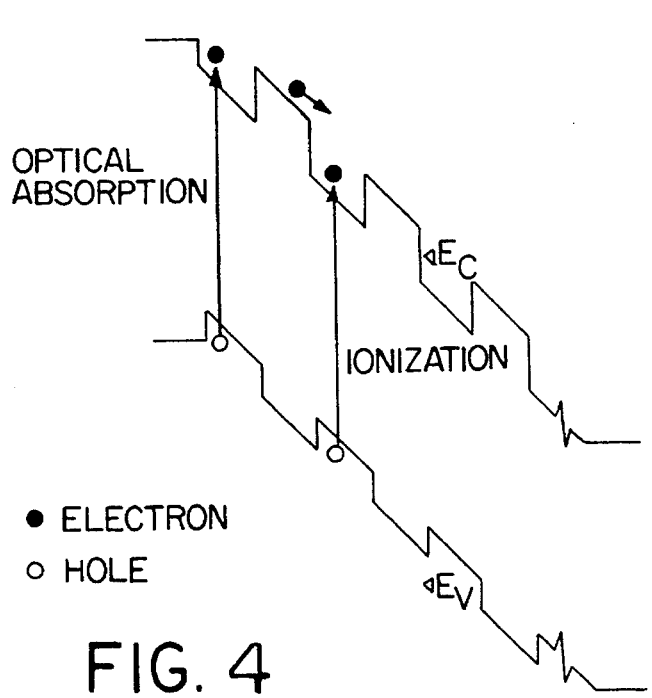
FIG. 4
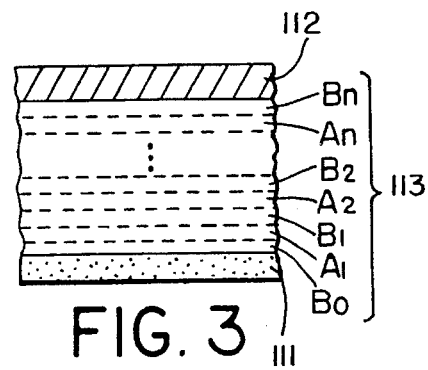
FIG. 3

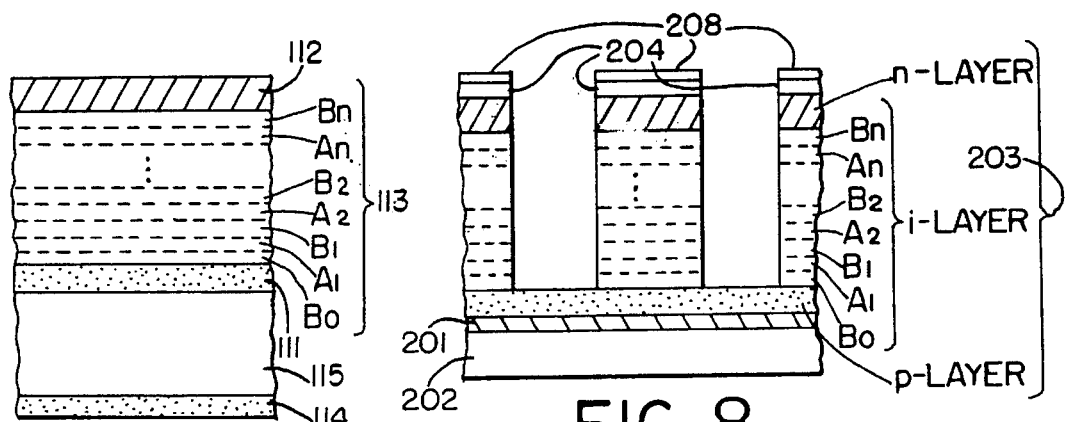
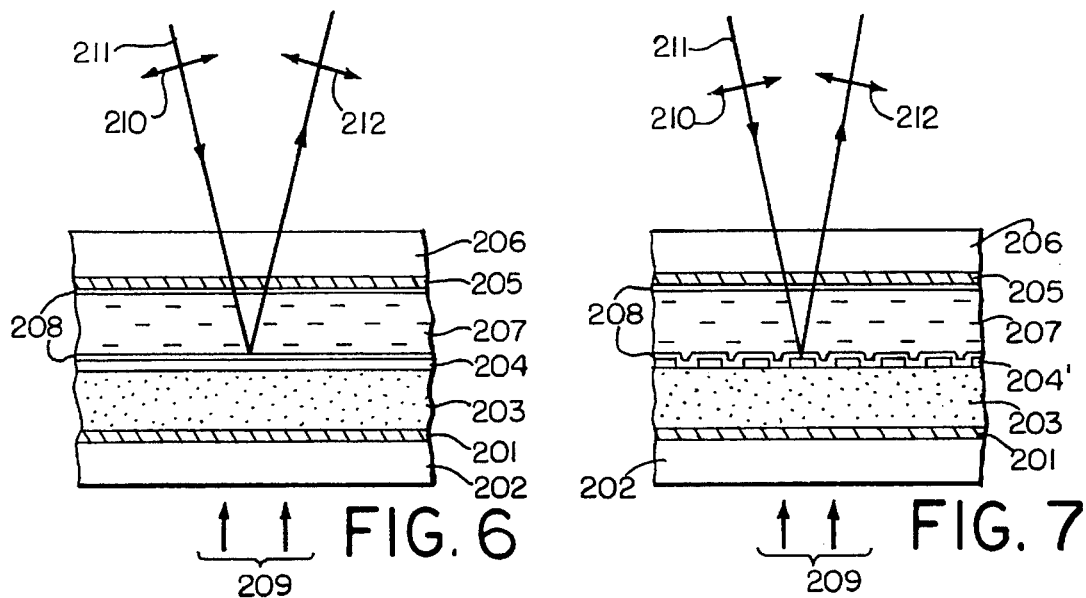
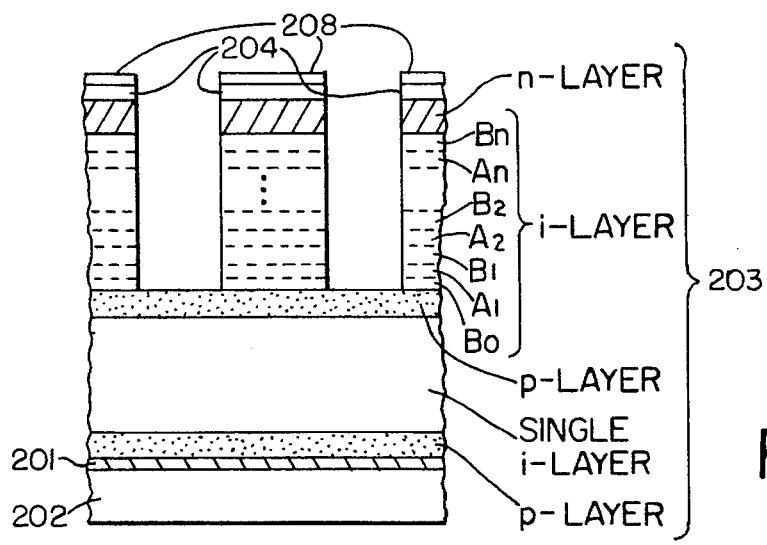

SPATIAL LIGHT MODULATOR HAVING A PHOTOCONDUCTOR WITH GROOVES AND A QUANTUM EFFICIENCY GREATER THAN UNITY

BACKGROUND OF THE INVENTION

1. Field of the Invention

The present invention relates to a spatial light modulator used for an optical processor, a projection display, a rewritable hologram display, and the like, and a method for fabricating the same.

2. Description of the Related Art

A spatial light modulator (hereinafter, referred to as an SLM) of an optically addressable type having a modulating portion and a photoconductor layer (the SLM as used herein refers to this optically addressable type) have many functions including optical thresholding operation, wavelength conversion, incoherent/coherent conversion, and image storing. The SLM is therefore recognized as a key device for optical information processing. The SLM also has a function of optical amplification, allowing for the use for a projection display. It therefore has excellent versatility.

The modulating portion and the photoconductor layer of the SLM are sandwiched by two transparent conductive electrodes. The optical transmittance of the modulating portion changes depending on the voltage applied between the transparent conductive electrodes. The principle of the operation of the SLM is as follows: the photoconductor layer is illuminated by a writing light while a voltage is applied between the transparent conductive electrodes, so as to change the electric resistivity of the photoconductor layer. This causes a change in the voltage applied to the modulating portion, and by this change the transmittance of the modulating portion is modulated.

The most convenient type of such an SLM with high photosensitivity, high-speed response, and low operating voltage is the one using hydrogenated amorphous silicon (hereinafter, referred to as "a-Si:H") as the photoconductor layer and ferroelectric liquid crystal (hereinafter, referred to as FLC) as the modulating portion. Currently, this type of SLM has been most actively studied and developed. FIG. 18 shows a typical example of this type of the SLM (refer to G. Moddel et al., Appl. Phys. Lett., 55 (1989), p. 537). Referring to FIG. 18, the SLM includes a photoconductor layer 701 which is a pin diode made of a-Si:H and an FLC layer 702. The photoconductor layer 701 and the FLC layer 702 are sandwiched by transparent insulating substrates 705 and 706 on which transparent conductive electrodes 703 and 704 are formed, respectively.

As mentioned above, the SLM is applicable to a projection display by utilizing the function of optical amplification. In this application, an image is written into a photoconductor layer with a weak writing light, which is then transferred onto a liquid crystal layer (hereinafter, referred to an LC layer) and read therefrom with an intensive reading light, so as to project a magnified image on a large screen. In order to prevent the intensive reading light from leaking into the photoconductor layer, a reflecting mirror composed of multilayers of dielectrics is formed between the photoconductor layer and the LC layer. In order to enhance the resolution of the image to be read, U.S. Pat. No. 4,913,531, for example, describes the use of separated pixels of reflector 801 as the reflecting mirror as shown in FIG. 19.

However, the conventional SLM has disadvantages as described below. The photoconductor layer of the conventional SLM, which is formed of a diode, is illuminated by the writing light while a reverse bias is applied. This results in that only the current which flows in the photoconductor layer is the primary photocurrent. In other words, the amount of a photocurrent flowing in the photoconductor layer is determined by the number of photons entering the photoconductor layer when the photoconductor layer is illuminated by the writing light. This indicates that the current with a quantum efficiency of more than 1 does not flow in the photoconductor layer.

Further, the amount of charges for a unit area at the interface of the photoconductor layer and the LC layer required to induce a voltage large enough to switch the state of the LC layer depends on the liquid crystal material and the cell thickness. Accordingly, given the ideal conditions where the photocurrent with a quantum efficiency of 1 flows in the photoconductor layer at a response speed sufficiently higher than that of the liquid crystal, the intensity of the incident light (photosensitivity) required to switch the LC layer is independent of the properties of the photoconductor layer. The a-Si:H pin diode structure is known to provide these ideal conditions (refer to K. Akiyama et al., Jpn. J. Appl. Phys., 30 (1991) p. 3887, for example).

Since the photoconductor layer of the conventional SLM is already in such ideal conditions, it is impossible to seek for an SLM with higher photosensitivity unless a novel liquid crystal material having a higher response speed at a low-voltage operation can be developed. In the meantime, realization of an SLM with higher photosensitivity is a most critical issue in the field of optical computation which conducts a massively parallel processing. This is because, as the level of the parallel processing enhances, the total amount of writing light increases and thus a light source capable of supplying a larger power of light is required. This results in the light source to be used is determined on the required amount of light, and the power consumption of the light source, so, as a result the operation cost increases. For these reasons, higher photosensitivity in the SLM is strongly desired.

As mentioned earlier, the reflecting mirror composed of multilayers of dielectrics is formed between the photoconductor layer and the LC layer in order to prevent the reading light from leaking into the photoconductor layer. As shown in FIG. 19, to ensure the prevention of the leaking, a groove is formed in a portion of a photoconductor layer 802 corresponding to the gap between reflector pixels 801, and another reflector 803 made of Al or the like is formed in the groove. In this structure, however, short-circuiting tends to occur between the reflector pixels 801 and the reflector 803. On the other hand, without the reflector 803, the trouble of short-circuiting is prevented, but a number of photocarriers are generated around the groove in the photoconductor layer 802 by the illumination of an intensive reading light, and diffuse laterally in the photoconductor layer 802. This lowers the resistivity of portions of the photoconductor layer 802 covered with the reflector pixels 801, causing the LC layer to be switched on even when a writing light is not incident.

SUMMARY OF THE INVENTION

The spatial light modulator of this invention comprises a modulating layer having optical properties changeable depending on the strength of an applied electric field; a pair of transparent electrode layers sandwiching the modulating layer for generating the electric field; and a photoconductor layer disposed between one of the pair of transparent electrode layers and the modulating layer for generating a photocurrent corresponding to the illumination by light, wherein the photoconductor layer has a quantum efficiency of more than 1.

According to another aspect of the present invention, the spatial light modulator comprises: a modulating layer having optical properties changeable depending on the strength of an applied electric field; a pair of transparent electrode layers sandwiching the modulating layer for generating the electric field; a photoconductor layer disposed between one of the pair of transparent electrode layers and the modulating layer for generating a photocurrent corresponding to the illumination by light; and a plurality of reflecting layers arranged in a matrix between the modulating layer and the photoconductor layer, wherein the plurality of reflecting layers respectively reflect part of light incident to the modulating layer from outside of the spatial light modulator, and wherein the photoconductivity of uncovered portions of the photoconductor layer into which the light is transmitted without being reflected from the plurality of reflecting layers is smaller than that of the other portions of the photoconductor layer.

According to yet another aspect of the present invention, the spatial light modulator comprises: a modulating layer having optical properties changeable depending on the strength of an applied electric field; a pair of transparent electrode layers sandwiching the modulating layer for generating the electric field; a photoconductor layer disposed between one of the pair of transparent electrode layers and the modulating layer for generating a photocurrent corresponding to the illumination by light; and a plurality of reflecting layers arranged in a matrix between the modulating layer and the photoconductor layer, wherein the plurality of reflecting layers respectively reflect part of light incident to the modulating layer from outside of the spatial light modulator, and wherein element impurities are distributed unevenly along the depth of the photoconductor layer in portions of the photoconductor layer into which the light is transmitted without being reflected from the plurality of reflecting layers.

According to yet another aspect of the present invention, the method for fabricating a spatial light modulator comprising: a modulating layer having optical properties changeable depending on the strength of an applied electric field; a pair of transparent electrode layers sandwiching the modulating layer for generating the electric field; a photoconductor layer disposed between one of the pair of transparent electrode layers and the modulating layer for generating a photocurrent corresponding to the illumination by light; and a plurality of reflecting layers arranged in a matrix between the modulating layer and the photoconductor layer, comprises a step of: illuminating portions of the photoconductor layer uncovered with the plurality of reflecting layers by light after the formation of the plurality of reflecting layers using the plurality of reflecting layers as a mask.

According to yet another aspect of the present invention, the method for fabricating a spatial light modulator comprising: a modulating layer having optical properties changeable depending on the strength of an applied electric field; a pair of transparent electrode layers sandwiching the modulating layer for generating the electric field; a photoconductor layer disposed between one of the pair of transparent electrode layers and the modulating layer for generating a photocurrent corresponding to the illumination by light; and a plurality of reflecting layers arranged in a matrix between the modulating layer and the photoconductor layer, comprises a step of: implanting impurities to the photoconductor layer after the formation of the plurality of reflecting layers using the plurality of reflecting layers as a mask.

In general, in a spatial light modulator including a modulating portion made of dielectric or ferroelectric material and a photoconductor layer which are sandwiched by two transparent conductive electrodes, the modulating portion operates as a blocking layer for the photoconductor layer. Accordingly, a primary photocurrent is induced in the photoconductor layer at the illumination by a writing light, indicating that a photocurrent having a quantum efficiency of more than 1 does not flow therein. According to the present invention, in order to enhance the photosensitivity of the SLM, the quantum efficiency is increased to more than 1 by multiplying the number of carriers by the electron avalanche effect.

In a reflection-mode spatial light modulator having an array of reflector pixels between the photoconductor layer and the optical modulating layer, a comparatively intensive reading light may be used to read images. In this case, it is required to prevent the reading light from leaking into the photoconductor layer through gaps between the reflector pixels and causing a malfunction of the SLM. This may be prevented by blocking the reading light from entering the photoconductor layer by some physical means. However, a more effective method is to make it difficult for the photocurrent to flow into the photoconductor layer even when the reading light enters the photoconductor layer. This is done by inducing defects or implanting impurities in portions of the photoconductor layer corresponding to the gaps between the reflector pixels (hereinafter, referred to as "uncovered portions") so as to prevent the movement of carriers. When an amorphous silicon material is used for the photoconductor layer, such defects can be induced by illuminating the photoconductor layer with intensive light to generate unpaired electrons called dangling bonds. The existence of the dangling bonds deteriorates the photoconductivity of the layer. Alternatively, ions accelerated by the application of an electric field may be easily implanted as impurities into the photoconductor layer through the gaps. According to this method, since the bonding between atoms is released due to the ion bombardment, unpaired electrons can be generated simultaneously.

Thus, the invention described herein makes possible the advantages of (1) providing a spatial light modulator operable at high speed with high photosensitivity, in which the photocurrent having a quantum efficiency of more than 1 flows into the photoconductor layer, (2) providing a spatial light modulator in which the liquid crystal layer can be prevented from being switched on by a reading light, to allow for the projection with high-intensity light, and (3) providing methods for fabricating such a spatial light modulator.

These and other advantages of the present invention will become apparent to those skilled in the art upon reading and understanding the following detailed description with reference to the accompanying figures.

BRIEF DESCRIPTION OF THE DRAWINGS

FIG. 1 is a sectional view of a spatial light modulator according to the present invention.

FIG. 2 is a sectional view of a modification of the spatial light modulator of FIG. 1.

FIG. 3 is a sectional view of a photoconductor layer used for the spatial light modulator of the present invention.

FIG. 4 is a band model of the photoconductor layer of FIG. 3.

FIG. 5 is a sectional view of another photoconductor layer used for the spatial light modulator of the present invention.

FIG. 6 is a sectional view of a spatial light modulator of the present invention, in which liquid crystal is used as the optical modulating layer of FIG. 1.

FIG. 7 is a sectional view of a modification of the spatial light modulator of FIG. 6.

FIG. 8 is a sectional view of a photoconductor layer used for the spatial light modulator of FIG. 7.

FIG. 9 is a sectional view of another photoconductor layer used for the spatial light modulator of FIG. 7.

DESCRIPTION OF THE PREFERRED EMBODIMENTS

Figures 10, 11:
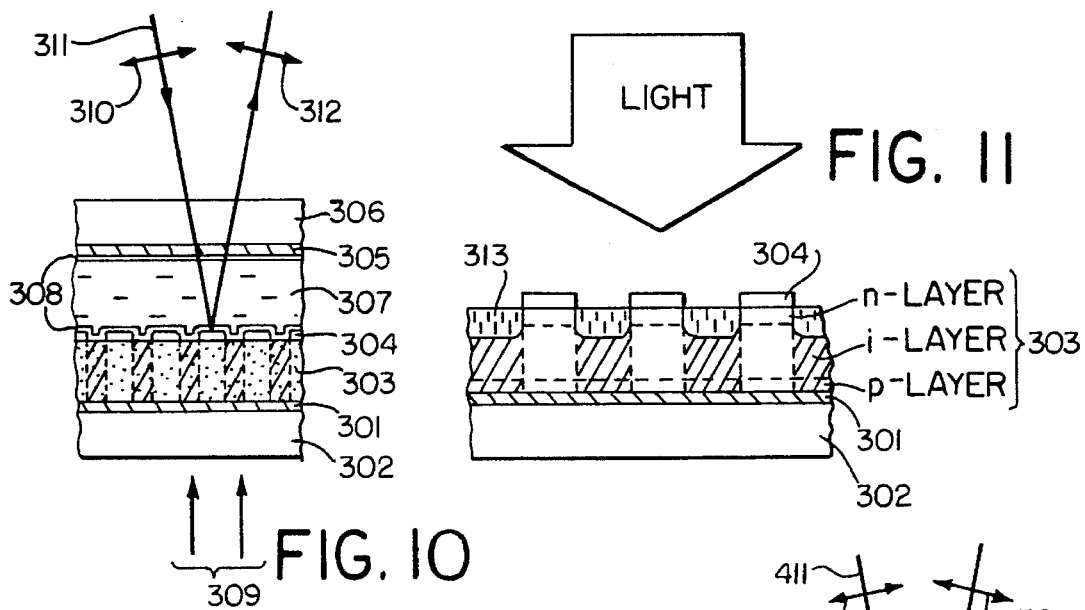
FIG. 10 is a sectional view of another spatial light modulator according to the present invention.
FIG. 11 is a sectional view of a photoconductor layer used for the spatial light modulator of FIG. 10.

The present invention is described by way of example with reference to the attached drawings as follows:

FIG. 1 shows an embodiment of a spatial light modulator according to the present invention. Referring to FIG. 1, a transparent conductive electrode 102 (made of a conductive oxide such as indium tin oxide (ITO), ZnO, or $SnO_2$, for example) is formed on a transparent insulating substrate 101 (made of glass, for example), and an optical modulating layer 103, a reflecting mirror 104, a photoconductor layer 105, and a transparent conductive electrode 102 are formed on the transparent conductive electrode 102 in this order.

For the optical modulating layer 103, a thin film or thin plate of an electro-optical crystal made of $KD_2PO_4$, $Bi_{12}SiO_{20}$, PLZT, $LiNbO_3$, $LiTiO_3$, $Bi_4Ti_3O_{12}$, or the like is used. The thin film is formed by a sputtering method or a chemical vapor deposition (CVD) method, for example. The thin plate is obtained by slicing a lump of crystal and polishing the sliced crystal. When the thin plate is used, the transparent conductive electrode 102 can be formed without the use of the transparent insulating substrate 101.

When the photoconductor layer 105 is illuminated by a writing light 107 while a voltage is applied between the transparent conductive electrodes 102 and 106, the voltage applied to portions of the optical modulating layer 103 corresponding to portions of the photoconductor layer 105 illuminated by the light increases, causing a change in the refractive index at the former portions. A reading light 110 is incident to the SLM from the side thereof opposite to the side from which the writing light 107 is incident, and reflected from the reflecting mirror 104. The change in the refractive index is observed by detecting the reflecting light through an optical system composed of a polarizer 108 and an analyzer 109.

The reflecting mirror 104 may have a multilayer structure in which thin films made of material having a large dielectric coefficient such as $TaO_2$ and Si and thin films made of material having a small dielectric coefficient such as MgF and $SiO_2$ are alternately layered. Alternatively, a thin film made of metal having a large reflectance such as Al, Ag, Mo, Ni, Cr, and Mg can be used. When metal is used, the reflecting mirror 104 needs to be an array of reflector pixels as shown in FIG. 2.

The photoconductor layer 105 has a pin diode structure and is formed on the transparent conductive electrode 106 to which the writing light 107 is incident. This pin diode structure provides the photoconductor layer 105 with a rectification property, which increases the dark resistance of the photoconductor layer 105, and as a result a significant change in the voltage applied to the optical modulating layer 103 is obtained.

Also, the photoconductor layer 105 provides the electron avalanche effect, which occurs when the writing light 107 is incident to the photoconductor layer 105 while a reverse bias is applied between the transparent conductive electrodes 102 and 106 from outside. This causes the primary photocurrent having a quantum efficiency of more than 1 to flow in the photoconductor layer 105. This effect can be obtained simply by applying a high reverse bias to the pin junction to accelerate carriers. The ionization rate of carriers depends on the materials constituting the pin junction. The ionization rate can be controlled by using a superlattice. FIG. 3 shows the structure of the photoconductor layer 105 having a superlattice. The pin diode structure is composed of a p-layer 111, an n-layer 112, and an i-layer 113 having a superlattice interposed therebetween. The superlattice is formed by alternately stacking barrier layers $A_i$ (i=1, 2, ... , n) having a large band-gap and well layers $B_i$ (i=0, 1, ... , n) having a small band-gap. In FIG. 3, the i-layer 113 is composed of n periods of the barrier layers $A_i$/well layers $B_i$ plus the well layer $B_0$. The carrier multiplication by using the superlattice will be briefly described using a band model of the photoconductor layer 105 shown in FIG. 4. Refer to R. Chin et al., Electron. Lett. 16(12) (1980), p. 467 for details.

Pairs of electrons and holes generated in the well layers $B_i$ by optical absorption are separated by the application of an electric field, allowing the electrons to enter the bulk and the holes to move toward the p-layer. As shown in FIG. 4, assume that steps are present between the barrier layers $A_i$ and the well layers $B_i$ by $\Delta E_C$ in the conduction band and by $\Delta E_V$ in the valence electron band ($\Delta E_C > \Delta E_V$). When electrons move from the barrier layers $A_i$ to the well layers $B_i$, they gain a kinetic energy by $\Delta E_C$. The electrons which have gained such a large kinetic energy and have been sufficiently accelerated collide with other electrons, causing excitation of electrons to the conduction band (ionization). This causes new electrons and holes to be generated, thus multiplying the photocurrent. The newly generated electrons and holes are also accelerated and ionized. Thus, the number of carriers is multiplied in an avalanche (avalanche multiplication). As a result, the photocurrent having a quantum efficiency largely exceeding 1 flows into the photoconductor layer 105.

The photoconductor layer 105 is preferably made of materials which can form a film over a wide range at a comparatively low temperature (400° C. or less). Examples include hydrogenated amorphous Si, Ge, $Si_{1-x}C_x$, $Si_{1-x}Ge_x$, $Ge_{1-x}C_x$, $Si_{1-x}N_x$, (hereinafter, referred to as a-Si:H, a-Ge:H, a-Si$_{1-x}$C$_x$:H, a-Si$_{1-x}$Ge$_x$:H, a-Ge$_{1-x}$C$_x$:H, a-Si$_{1-x}$N$_x$:H, respectively). As is known, in order to effectively decrease the number of the dangling bonds, halogen atoms such as F and Cl may be added in place of hydrogen to, and/or a minute amount (e.g., 0.1–10 at. %) of oxygen atoms may be contained in the above materials. The ionization energies of these materials are not so widely different from one another (i.e., $\Delta E_V$ is small; 0.1 eV or less). Accordingly, when any two of these materials of which band-gaps are largely different from each other are combined to form a superlattice, the difference of the band-gaps of these materials is neatly equal with $\Delta E_C$. This makes it possible to selectively increase the electron ionization rate. Also, these materials have a mobility of electrons larger than that of holes. This allows for high speed operation, as well as lownoise avalanche multiplication. Concrete combinations of these materials include a-Si:H (A layer) and a-Ge:H (B layer), a-Si$_{1-x}$C$_x$:H (A layer) and a-Si:H (B layer), a-Si$_{1-x}$C$_x$:H (A layer) and a-Si$_{1-x}$Ge$_x$:H (B layer), a-Si$_{1-x}$C$_x$:H (A layer) and a-Ge:H (B layer), a-Si:H (A layer) and a-Si$_{1-x}$Ge$_x$:H (B layer), a-Si$_{1-x}$C$_x$:H (A layer) and a-Ge$_{1-x}$C$_x$:H (B layer), a-Ge$_{1-x}$C$_x$:H (A layer) and a-Si:H (B layer), a-Ge$_{1-x}$C$_x$:H (A layer) and a-Ge:H (B layer), a-Si$_{1-x}$N$_x$:H (A layer) and a-Si:H (B layer), a-Si$_{1-x}$N$_x$:H (A layer) and a-Si$_{1-x}$Ge$_x$:H (B layer), a-Si$_{1-x}$N$_x$:H (A layer) and a-Ge:H (B layer). Furthermore, since the above materials are also characterized by the fact that the band-gap largely changes depending on the hydrogen content in the layers, the combination of layers of the same material having a large hydrogen content (A layer) and a small hydrogen content (B layer) is also possible.

For the formation of the p-layer 111 and the n-layer 112, B, Al, Ga, or the like is preferably used as a p-type impurity, and N, P, As, Sb, Se, or the like is preferably used as an n-type impurity. Instead of forming the p-layer and n-layer, insulating layers with a large forbidden band (e.g., a-C:H, GeN$_x$, SiN$_x$, and SiO$_x$) can be used to form a blocking structure.

FIG. 5 shows another structure of the photoconductor layer 105 using a superlattice. In the structure of FIG. 3, the generation of photocarriers and the avalanche multiplication occur in the superlattice portion. In the structure of FIG. 5, however, a p-layer 114 and a single i-layer 115 are added to operate as layers for generating carriers by the absorption of an incident light. By this structure, the multiplication coefficient can be further increased.

FIG. 6 shows an alternative example of the SLM of the above embodiment, in which liquid crystal is used for the optical modulating layer. Referring to FIG. 6, on a transparent insulating substrate 202 (made of glass, for example) coated with a transparent conductive electrode 201 (made of a conductive oxide such as ITO, SnO$_2$, and ZnO, for example), a photoconductor layer 203 and a reflecting mirror 204 made of dielectric material are formed in this order. Then, the transparent insulating substrate 202 with the above multilayer structure and a transparent insulating substrate 206 coated with a transparent conductive electrode 205 sandwich an LC layer 207. On both surfaces of the LC layer 207 are disposed alignment layers 208 which are obliquely evaporated SiO$_x$ films or rubbed polymer films.

The SLM with the above-described structure operates as described earlier for the SLM of FIG. 1. When the SLM is illuminated by a writing light 209, the voltage applied to the LC layer 207 changes, resulting in the change of the alignment of liquid crystal molecules. This change of the alignment is detected by radiating a reading light 211 through a polarizer 210 into the SLM and receiving the reflecting light thereof through an analyzer 212.

The LC layer 207 is preferably made of nematic liquid crystal, FLC, polymer dispersed liquid crystal in which liquid crystal is dispersed in a polymer, or the like. Using FLC is advantageous in that: (1) since the LC layer can be thinner, the electric impedance can be small, which allows the photoconductor layer 203 to be made thinner; (2) high-speed response is possible, and (3) a memory function can be provided. Also, the transmittance of the FLC sharply changes when the applied voltage is beyond a threshold value. This property makes the FLC an optimal material for the processing of light by a threshold. On the other hand, the polymer dispersed liquid crystal is advantageous in that since a polarizer and an alignment film are unnecessary, the SLM and the optical system can be simplified.

FIG. 7 shows a modification of the SLM of FIG. 6, in which the reflecting mirror 204 is replaced with an array of reflector pixels 204'. The array of reflector pixels 204' can be made of the dielectric material or metal films described earlier relating to the SLM of FIG. 2. The distance between the adjacent reflector pixels 204' may be as small as 10 µm or less in order to enhance the resolution. In such a case, portions of the photoconductor layer 203 having the superlattice structure corresponding to the gaps between the adjacent reflector pixels 204' (uncovered portions) need to be removed by etching as shown in FIGS. 8 and 9 for the photoconductor layers 203 of FIGS. 3 and 5, respectively, so that the diffusion of carriers in the lateral direction inside the superlattice can be prevented. By this etching, the diffusion of carriers in the lateral direction is minimized, and thus the resolution of the SLM can be enhanced.

The SLMs of FIGS. 1, 2, 6, and 7 are of the reflection type. However, they can be modified to a transmission type by removing the reflecting mirror 104 or 204 or replacing the array of reflector pixels with a transparent conductive electrode made of ITO, SnO$_2$, ZnO, or the like, by disposing the polarizer and the analyzer in opposite sides of the SLM, and by allowing the reading light and the writing light to be incident to the SLM from the same side.

A second embodiment of the SLM of the present invention is shown in FIG. 10. Referring to FIG. 10, on a transparent insulating substrate 302 coated with a transparent conductive electrode 301, a photoconductor layer 303 made of amorphous semiconductor material containing Si as a main component as described earlier and an array of reflector pixels 304 are formed in this order. Then, the transparent insulating substrate 302 with the above multilayer structure and a transparent insulating substrate 306 coated with a transparent conductive electrode 305 sandwich an LC layer 307. Alignment layers 308 are formed on both surfaces of the LC layer 307. Materials used for these layers are the same as those described earlier. The photoconductor layer 303 in this embodiment need not have the rectification property.

The SLM of this embodiment operates as described earlier as for the SLM of FIG. 6. When the SLM is illuminated by a writing light 309, the voltage applied to the LC layer 307 changes, resulting in the change of the alignment of liquid crystal molecules. This change of the alignment is detected by radiating a reading light 311 through a polarizer 310 into the SLM and receiving the reflecting light thereof through an analyzer 312. The hatched portions of the photoconductor layer 303 in FIG. 10 which correspond to the gaps between the reflector pixels 304 (i.e., the uncovered portions) are made inferior in the photoconductivity as described below, compared with the remaining portions which are covered with the reflector pixels 304.

When the photoconductor layer 303 has the pin diode structure, the uncovered portions of an n-layer which may cause a decrease in the resolution are desirably removed as shown in FIG. 11. One method for lowering the photoconductivity of the uncovered portions of the photoconductor layer 303 (the hatched portions in FIGS. 10 and 11) is as follows: as shown in FIG. 11, the photoconductor layer 303 is illuminated by intensive visible light for a predetermined period of time (e.g., AM-1 100 mW/cm$^2$, at least one hour; i.e., 360 J/cm$^2$ or more). By this method, the photoconductivity of the amorphous silicon semiconductor is lowered. In this way, the decrease of the photoconductivity thereof is lowered more than an order of magnitude. Thereafter, light absorption layers 313 are formed on the uncovered portions of the photoconductor layer 303 (by applying a polymer containing a black pigment, for example). With this structure, the LC layer 307 can be prevented from being switched by the illumination of the intensive reading light 311.

Figures 12, 13:
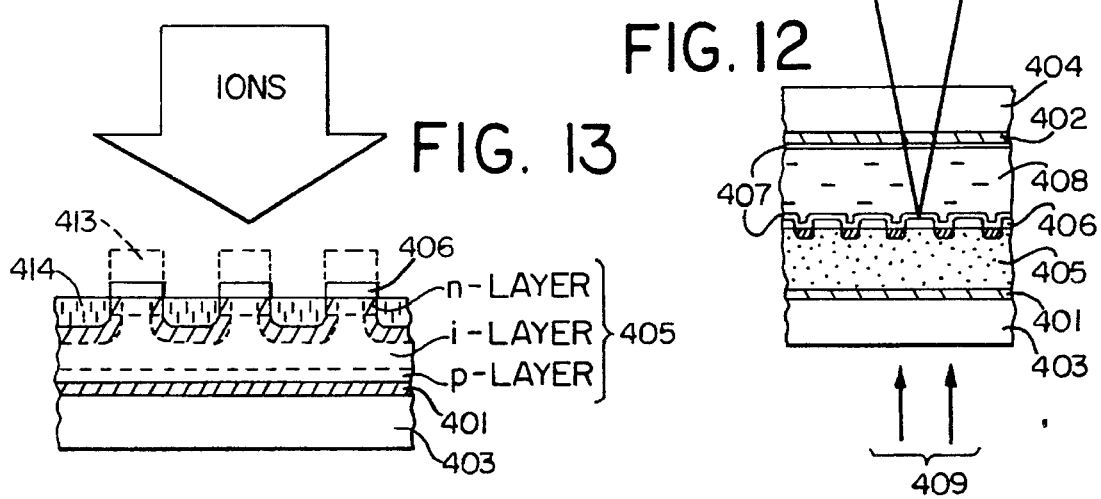
FIG. 12 is a sectional view of still another spatial light modulator according to the present invention.
FIG. 13 is a sectional view of a photoconductor layer used for the spatial light modulator of FIG. 12.
Figure 14:
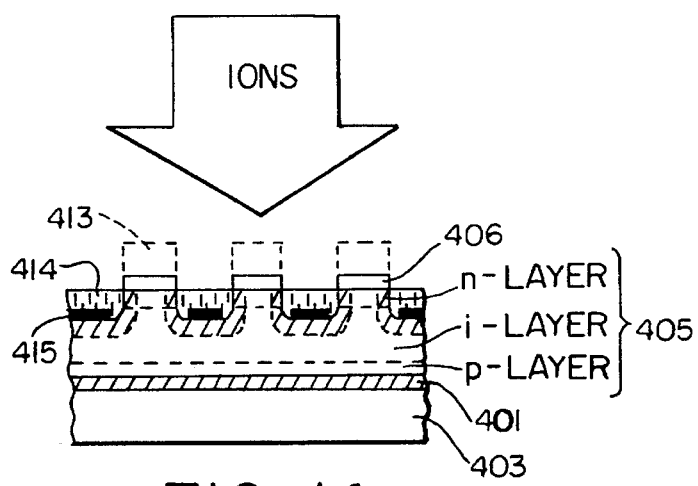
FIG. 14 is a sectional view of another photoconductor layer of the spatial light modulator of FIG. 13.

A third embodiment of the SLM of the present invention is shown in FIG. 12. The structure of the SLM of this embodiment is the same as that of the second embodiment. That is, transparent insulating substrates 403 and 404 coated with transparent conductive electrodes 401 and 402, respectively, sandwich a photoconductor layer 405 made of amorphous semiconductor material containing Si as a main component as described earlier, an array of reflector pixels 406, and an LC layer 408 with alignment layers 407 disposed on both surfaces thereof. Materials used for these layers are the same as those described above. The photoconductor layer 405 in this embodiment need not have the rectification property.

The SLM of this embodiment operates as described earlier as for the SLM of FIG. 6. When the SLM is illuminated by a writing light 409, the voltage applied to the LC layer 408 changes, resulting in the change of the alignment of liquid crystal molecules. This change in the alignment is detected by radiating a reading light 411 through a polarizer 410 into the SLM and receiving the reflecting light thereof through an analyzer 412. The hatched portions of the photoconductor layer 405 in FIG. 12 which correspond to the gaps between the reflector pixels 406 (i.e., uncovered portions) indicate portions into which specific impurities have been implanted.

When the photoconductor layer 405 has the pin diode structure, the uncovered portions of an n-layer which may cause a decrease in the resolution are desirably removed as shown in FIG. 13. One method for implanting impurities into the uncovered portions of the photoconductor layer 405 (the hatched portions in FIGS. 12 and 13) is as follows: after the patterning by photolithography to form the array of reflector pixels 406 (after the removal of the uncovered portions of the n-layer and part of an i-layer in the case of FIG. 13), accelerated impurity ions are implanted into the photoconductor layer 405 by the application of an electric field with a resist 413 kept unremoved. Then, the resist 413 is removed, and light absorption layers 414 are formed on the uncovered portions of the photoconductor layer 405 (by applying a polymer containing a black pigment, for example). With this structure, the LC layer 408 can be prevented from being switched by the illumination with the intensive reading light 411.

Impurities to be implanted include rare gases such as helium, neon, argon, krypton, and xenon, halogen gases such as fluorine and chlorine, hydrogen, carbon, nitrogen, and oxygen. Rare gases release the bonding of atoms composing the film at the time of implantation, but do not bond with other atoms in the film. Thus, the density of unpaired electrons increases, resulting in greatly lowering the photoconductivity of the impurity-implanted portions. Halogen gases or hydrogen which are univalent atoms release the Si—Si bonding, and, in the case of hydrogen, Si—H bonding and —Si (an unpaired electron) are formed, thus increasing the density of unpaired electrons. Carbon, nitrogen, and oxygen are effective as impurities in lowering the photoconductivity in amorphous silicon.

As described above, by implanting the above impurities into the uncovered portions of the photoconductor layer 405, the photoconductivity of the impurity-implanted portions lowers, and thus the photoconductor layer 405 become inactive. This prevents the LC layer 408 from being switched by the illumination with the reading light 411. Moreover, when a large amount of a halogen gas, hydrogen, carbon, nitrogen, or oxygen is contained in an amorphous silicon film, the dark resistivity of the film increases. This minimizes the leakage of charges through the gaps between the reflector pixels 406, and thus improves the resolution. Besides the above elements, boron can be added when the photoconductor layer 405 has the pin structure as shown in FIG. 13, to form a pip structure in the uncovered portions of the photoconductor layer 405. The pip structure generates an internal electric field, which suppresses the movement of electrons toward the LC layer 408. This produces an effect of lowering the photoconductivity. This effect can be enhanced by adding boron ions in an amount larger than that of impurities contained in another p-layer formed on the transparent conductive electrode 401 and by annealing at 150° to 300° C. after the ion implantation. In this structure, since the p-layer has higher resistivity compared with the n-layer and the i-layer in general, leakage of charges through the reflector pixels 406 can be minimized, and thus the resolution can be further improved.

The above-described SLMs according to the present invention will be further described in detail as examples as follows:

EXAMPLE 1

Referring to FIG. 8, the spatial light modulator of this example was fabricated as follows: ITO was deposited to a thickness of 0.05–0.2 μm on the transparent insulating substrate 202 by sputtering to form the transparent conductive electrode 201. Then, the photoconductor layer 203 was formed by depositing 0.01–0.1 μm of p-type a-Si:H as the p-layer, 10–50 periods of 50–500 angstroms of a-Si:H well layers/50–500 angstroms of a-Si$_{1-x}$C$_x$:H (0.2≦x≦0.35) barrier layers as the i-layer, and 0.05–0.5 μm of n-type a-Si:H as the n-layer by plasma CVD in this order. Subsequently, Al metal was deposited to a thickness of 0.05–0.5 μm on the photoconductor layer 203. Then, the Al metal film was covered with a resist and patterned by photolithography in order to form the array of reflector pixels 204'. Then, using the resist, the n-layer and the i-layer of the photoconductor layer 203 were selectively removed by etching. Thereafter, the rubbed alignment layer 208 made of polyimide was formed to cover the reflector pixels 204'. In this way, the substrate 202 having the multilayer structure shown in FIG. 8 was fabricated. Referring to FIG. 7, the patterned transparent conductive electrode 205 made of ITO and the alignment layer 208 made of polyimide were formed in this order on the other transparent insulating substrate 206. These transparent insulating substrates 202 and 206 with the multilayer structures were attached together with the ferroelectric LC layer 207 having a thickness of 0.5–2 μm sandwiched therebetween, and thus an SLM (1) was fabricated.

Another SLM (2) was also fabricated by the same method except that the i-layer of the photoconductor layer 203 was formed of undoped a-Si:H having the same thickness as that of the above superlattice structure.

Figure 16:
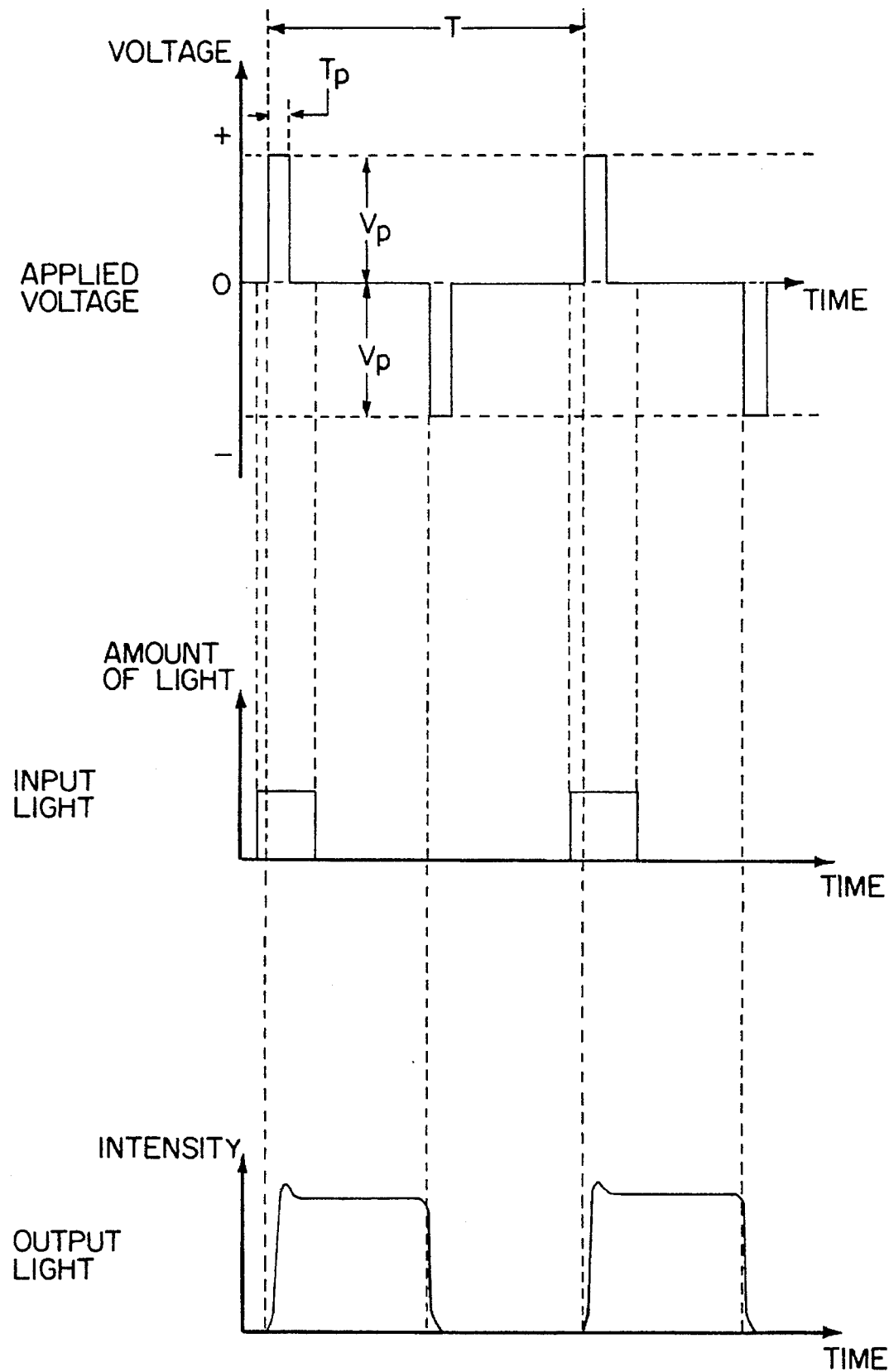
FIG. 16 is a timing chart of applied voltage, input light, and output light used for the spatial light modulator according to the present invention.

The SLMs (1) and (2) were test operated by applying an AC voltage having the waveform as shown in FIG. 16 ($V_p$=10–50 V, $T_p$:T=1:10, T=333 μs) between the two transparent conductive electrodes 201 and 205. Green LED light (center wavelength: 565 nm) was used for the writing light 209, and He—Ne laser light (wavelength: 633 nm) was used for the reading light 211. The test was performed by focusing these two kinds of light onto a single one of the reflector pixels 204'.

Referring to FIG. 16, the operation of the SLM will be briefly described. Note that the voltage is applied so as to be positive at the transparent conductive electrode 205. The SLM is illuminated by the input the writing light 209 when a positive pulse is applied and the photoconductor layer 203 is reversely biased. By this operation, the voltage applied to the LC layer 207 increases. With the increase in the voltage, the liquid crystal is switched from the OFF state to the ON state, allowing the reading light 211 to be output from the SLM through the LC layer 207. Then, when a negative pulse is applied and the photoconductor layer 203 is forward-biased, the liquid crystal is switched to the OFF state regardless of the illumination by light.

Under the above operating conditions, the photosensitivity and the rise time of the SLMs (1) and (2) were measured. The results were 1.5–3 μW and 30 μs for the SLM (1) and 15 μW and 30 μs for the SLM (2).

The photocurrent of the photoconductor layer 203 of the SLM (1) was also measured, and the quantum efficiency thereof was 3 to 10. The optical band gap determined by $h\gamma-(\alpha h\gamma)^{1/2}$ plotting was 1.75–1.8 eV for the a-Si:H well layers and 2.0–2.3 eV for the a-Si$_{1-x}$C$_x$:H barrier layers.

EXAMPLE 2

Referring to FIG. 9, the spatial light modulator of this example was fabricated as follows: ITO was deposited to a thickness of 0.05–0.2 μm on the transparent insulating substrate 202 by sputtering to form the transparent conductive electrode 201. Then, the photoconductor layer 203 was formed by depositing 0.01–0.1 μm of p-type a-Si:H as the first p-layer, 10–50 periods of 0.2–1 μm of a-Si:H as the i-layer, 0.01–0.1 μm of a-Si:H as the second p-layer, 10–50 periods of 50–500 angstroms of a-Si$_{1-x}$Ge$_x$:H (0.1≤x≤0.7) well layers/50–500 angstroms of a-Si$_{1-x}$C$_x$:H (0.05≤x≤0.25) barrier layers as the superlattice i-layer, and 0.05–0.5 μm of n-type a-Si:H as the n-layer by plasma CVD in this order. Subsequently, Al metal was deposited to a thickness of 0.05–0.5 μm on the photoconductor layer 203. Then, the Al metal was covered with a resist and patterned by photolithography to form the array of reflector pixels 204'. Then, using the resist, the n-layer and the superlattice i-layer of the photoconductor layer 203 were selectively removed by etching. Thereafter, the rubbed alignment layer 208 made of polyimide was formed to cover the reflector pixels 204'. In this way, the substrate 202 having the multilayer structure as shown in FIG. 9 was fabricated. Referring to FIG. 7, the patterned transparent conductive electrode 205 made of ITO and the alignment layer 208 made of polyimide were formed in this order on the other transparent insulating substrate 206. These transparent insulating substrates 202 and 206 with the multilayer structures were attached together with the ferroelectric LC layer 207 having a thickness of 0.5–2 μm sandwiched therebetween, and thus an SLM (3) was fabricated.

Another SLM (4) was also fabricated by the same method except that the superlattice i-layer of the photoconductor layer 203 was formed of undoped a-Si:H having the same thickness as that of the above superlattice structure.

The SLMs (3) and (4) were test operated by applying an AC voltage having the waveform as shown in FIG. 16 ($V_p$=10–50 V, $T_p$:T=1:10, T=333 μs) between the two transparent conductive electrodes 201 and 205. Green LED light (center wavelength: 565 nm) was used for the writing light 209, and He-Ne laser light (wavelength: 633 nm) was used for the reading light 211. The test was performed by focusing these two kinds of light onto a single one of the reflector pixels 204'.

Under the above operating conditions, the photosensitivity and the rise time of the SLMs (3) and (4) were measured. The results were 0.3–1.5 μW and 30 μs for the SLM (3) and 15 μW and 30 μs for the SLM (4).

The photocurrent of the photoconductor layer 203 of the SLM (3) was also measured, and the quantum efficiency thereof was 10 to 50.

EXAMPLE 3

Referring to FIG. 10, the SLM of this example was fabricated as follows: ITO was deposited to a thickness of 0.05–0.2 μm on the transparent insulating substrate 302 by sputtering to form the transparent conductive electrode 301. Then, an a-Si$_{1-x}$C$_x$:H (0.15≤x≤0.25) film of the pin diode structure having thicknesses of 0.01–0.3 μm, 0.1–1.2 μm, and 0.05–0.3 μm for pin, respectively, was deposited by plasma CVD to form the photoconductor layer 303. Subsequently, MgF and TaO$_2$ were alternately deposited on the photoconductor layer 303 to form a multilayered dielectric mirror, which was then patterned to form the array of the reflector pixels 304 (1000×2000 pcs., each 20–50 μm square, 23–55 μm pitch). Thereafter, portions of the n-layer and part of the i-layer of the photoconductor layer 303 corresponding to the gaps between reflector pixels 304 (uncovered portions) were removed. Then, as shown in FIG. 11, the photoconductor layer 303 was illuminated by light of AM-1 0.1 W/cm$^2$ from the side of the array of reflector pixels 304 for at least one hour (corresponding to an exposure of 360 J/cm$^2$), so as to optically deteriorate the uncovered portions of the photoconductor layer 303. Then, a polymer containing a black pigment was applied to the removed portions of the photoconductor layer 303 to form the light absorption layers 313. Thereafter, the rubbed alignment layer 308 made of polyimide was formed to cover the reflector pixels 304 and the light absorption layers 313. The patterned transparent conductive electrode 305 made of ITO and the alignment layer 308 made of polyimide were formed in this order on the other transparent insulating substrate 306. These transparent insulating substrates 302 and 306 with the multilayer structures were attached together with the ferroelectric LC layer 307 having a thickness of 0.5–2 μm sandwiched therebetween, and thus an SLM (5) was fabricated.

Another SLM (6) was also fabricated by the same method except that the exposure of the AM-1 light was 36 J/cm$^2$ or less.

Figure 17:
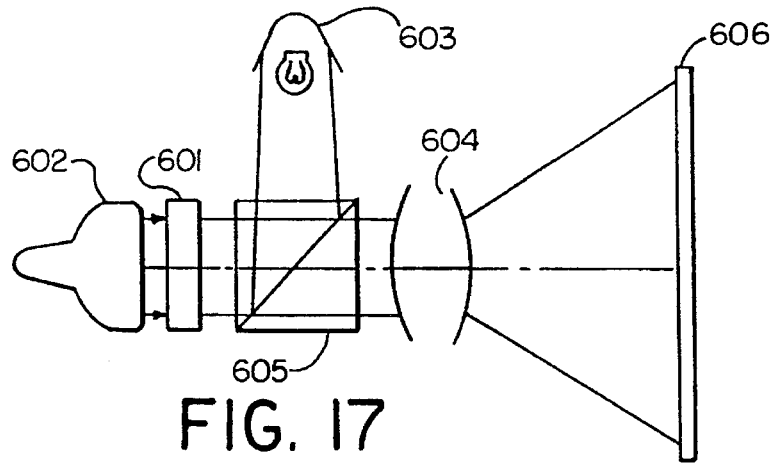
FIG. 17 is a structural view of a projection-type display apparatus incorporating the spatial light modulator according to the present invention.
Figure 18:
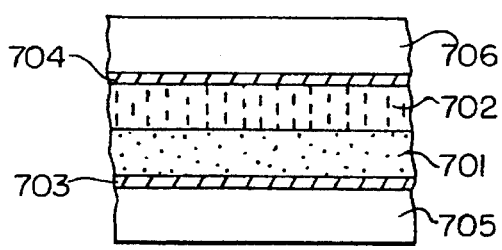
FIG. 18 is a sectional view of a conventional spatial light modulator.
Figure 19:
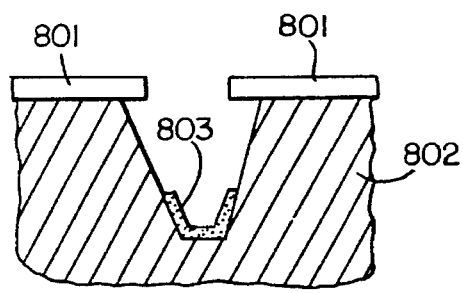
FIG. 19 is a sectional view of a photoconductor layer used for a conventional spatial light modulator.

A projection-type display apparatus as shown in FIG. 17 was manufactured to test the above SLMs (5) and (6). The display apparatus includes an SLM 601, a writing light source (CRT) 602, a projection light source (a halogen lamp with a reflector) 603, a projection lens system 604, a polarizing beam splitter 605, and a screen 606. An AC voltage having the waveform as shown in FIG. 16 ($V_p$=10–30 V, $T_p$:T=1:10, T=333 μs) was applied to the SLM 601. As a result, it was observed that an image displayed on the CRT 602 was projected on the screen 606 as a magnified image with high resolution. It was also observed that using the SLM (5) the image was projected with a light intensity higher than that in the case of using the SLM (6) by ten times or more.

The current-voltage characteristics of the photoconductor layer 303 was evaluated by placing an Al electrode in place of the above dielectric mirror. As a result, the photocurrent having a quantum efficiency of 5 to 100 was obtained under the conditions of the application of the reverse bias large enough to generate an electric field of 2×10$^5$ V/cm and the illumination by light of 400–600 nm.

Photoconductors identical to the photoconductor layer 303 used for the SLM (5) were formed on two silicon wafers. One of the silicon wafers was illuminated by light of AM-1 1 W/cm$^2$ for at least one hour, and the other was left unilluminated. These two silicon wafers were subjected to electron spin resonance (ESR) to measure the density of unpaired electrons. The results were 5–10×10$^{17}$ cm$^{-3}$ for the illuminated one and 8×10$^{16}$ cm$^{-3}$ for the unilluminated one.

EXAMPLE 4

Referring to FIG. 12, the SLM of this example was fabricated as follows: ITO was deposited to a thickness of 0.05–0.2 μm on a transparent insulating substrate 403 by sputtering to form the transparent conductive electrode 401. Then, an a-Si:H film of the pin diode structure having thicknesses of 0.01–0.1 μm, 0.5–1.6 μm, and 0.05–0.5 μm for pin, respectively, was deposited by plasma CVD to form the photoconductor layer 405. Subsequently, Al metal was deposited to a thickness of 0.05–0.5 μm on the photoconductor layer 405. Then, as shown in FIG. 13, the Al metal film was covered with a resist 413 and patterned by photolithography to form the array of reflector pixels 406 (1000× 2000 pcs., each 20–50 μm square, 23–55 μm pitch). Then, the n-layer and part of the i-layer of the photoconductor layer 405 were selectively removed by etching, and boron ions were implanted by applying a negative bias to the transparent conductive electrode 401 under the glow discharge of $B_2H_6$ diluted with hydrogen. Thereafter, after removing the resist 413, the multilayer structure was annealed at 250° C. A polymer containing a black pigment was then applied to the removed portions of the photoconductor layer 405 to form the light absorption layers 414. Thereafter, the rubbing-processed alignment layer 407 made of polyimide was formed to cover the reflector pixels 406 and the light absorption layers 414. The patterned transparent conductive electrode 402 made of ITO and the alignment layer 407 made of polyimide were formed in this order on the other transparent insulating substrate 404. These transparent insulating substrates 403 and 404 with the multilayer structures were attached together with the ferroelectric LC layer 408 having a thickness of 0.5–2 μm sandwiched therebetween, and thus an SLM (7) was fabricated.

Another SLM (8) was also fabricated by the same method except that the ion implantation of boron was not conducted.

The SLMs (7) and (8) were disposed in the projection-type display apparatus as shown in FIG. 17. An AC voltage having the waveform as shown in FIG. 16 ($V_p$=3–10 V, $T_p$:T=1:10, T=333 μs) was applied between the two transparent conductive electrodes 401 and 402. As a result, it was observed that an image displayed on the CRT 602 was projected on the screen 606 as a magnified image with high resolution. It was also observed that using the SLM (7) the image was projected with a light intensity higher than that in the case of using the SLM (8) by twenty times or more.

EXAMPLE 5

In this example, an optical reflecting layers 415 made of Cr, Al, or Mo were formed between the light absorption layers 414 and the photoconductor layer 405 of the SLMs (7) and (8) obtained in Example 4, after the ion implantation (or after removing portions of the n-layer and part of i-layer for the SLM (8)). In this way, SLMs (9) and (10) were fabricated, respectively. In this example, fluorine ions were implanted, instead of boron ions, using plasma of $SiF_4$, $SiH_2F_2$, or $CF_4$ gas under the application of a positive bias to the transparent conductive electrode 401.

The SLMs (9) and (10) were disposed in the projection-type display apparatus as shown in FIG. 17. An AC voltage having the waveform as shown in FIG. 16 ($V_p$=3–10 V, $T_p$:T=1:10, T=333 μs) was applied between the two transparent conductive electrodes 401 and 402. As a result, it was observed that an image displayed on the CRT 602 was projected on the screen 606 as a magnified image with high resolution. It was also observed that, using the SLMs (9) and (10), the projection light source 603 with a higher intensity could be used than in the case of using the SLMs in Example 4 by ten times or more. Further, it was observed that using the SLM (9) the image was projected by a light intensity higher than that in the case of using the SLM (10) by ten times or more.

EXAMPLE 6

Figure 15:
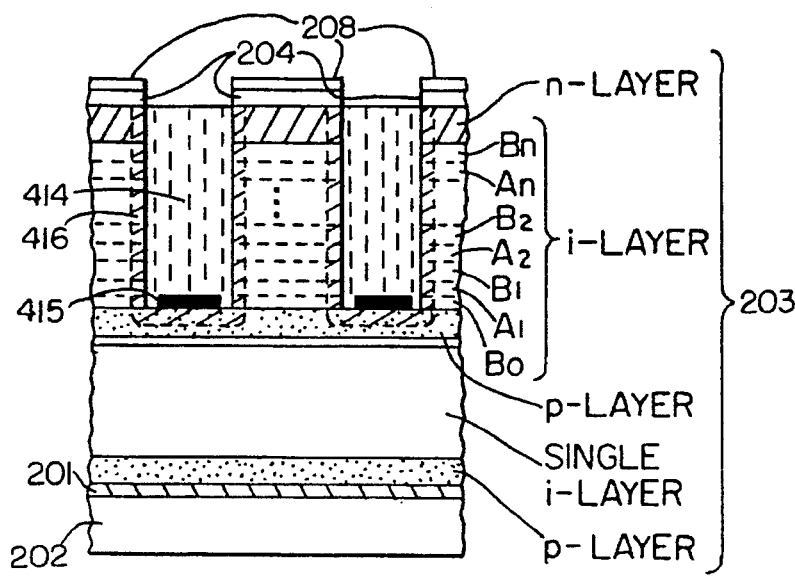
FIG. 15 is a sectional view of a photoconductor layer of the spatial light modulator of the present invention.

In this example, an SLM (11) was fabricated by the same method as that for the SLM (9) in Example 5, except that the photoconductor layer 203 in Example 2 was used in place of the photoconductor layer 405 as shown in FIG. 15. As in Example 5, fluorine ions were implanted to form ion implanted regions 416.

The SLM (11) was disposed in the projectiontype display apparatus as shown in FIG. 17. An AC voltage having the waveform as shown in FIG. 16 ($V_p$=10–50 V, $T_p$:T=1:10, T=333 μs) was applied between the two transparent conductive electrodes 401 and 402. As a result, it was observed that an image displayed on the CRT 602 was projected on the screen 606 as a magnified image with high resolution. It was also confirmed that using the SLM (11) the image could be projected on the screen 606 by the writing light with an intensity of only one-tenth or less of that in the case of the SLM (9) in Example 5.

The above SLMs (1), (3), (5), (7), (9), and (11) according to the present invention can also be used for the display of a rewritable hologram.

The light modulating layers, the photoconductive layers, and the transparent conductive electrodes to be used for the SLMs of the present invention are not limited to those described in the above examples.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A spatial light modulator, comprising:

a modulating layer having optical properties changeable depending on the strength of an applied electric field;

a pair of transparent electrode layers sandwiching said modulating layer for generating the electric field;

a photoconductor layer disposed between one of said pair of transparent electrode layers and said modulating layer for generating a photocurrent corresponding to the illumination by light; and a plurality of reflecting layers arranged in a matrix between said modulating layer and said photoconductor layer, wherein said photoconductor layer has a superlattice structure and generates a primary photocurrent having a quantum efficiency of more than 1, wherein said plurality of reflecting layers respectively reflect part of light incident to said modulating layer from outside of said spatial light modulator, and wherein grooves are formed by removing at least said superlattice structure of said photoconductor layer between said plurality of reflecting layers.

2. A spatial light modulator according to claim 1, wherein said photoconductor layer is made of amorphous silicon.

3. A spatial light modulator according to claim 1, wherein said modulating layer is made of liquid crystal.

4. A spatial light modulator comprising:

a modulating layer having optical properties changeable depending on the strength of an applied electric field;

a pair of transparent electrode layers sandwiching said modulating layer for generating the electric field;

a photoconductor layer disposed between one of said pair of transparent electrode layers and said modulating layer for generating a photocurrent corresponding to the illumination by light; and a plurality of reflecting layers arranged in a matrix between said modulating layer and said photoconductor layer, wherein said photoconductor layer has at least p-type, i-type and n-type regions and generates a primary photocurrent having a quantum efficiency of more than 1, wherein said plurality of reflecting layers respectively reflect part of light incident to said modulating layer from outside of said spatial light modulator, and wherein grooves are formed by removing at least said n-type region and a portion of said i-type region of said photoconductor layer between said plurality of reflecting layers.

* * * * *